Jan. 12, 1932.　　　　K. SLIDELL　　　　1,840,609
METHOD OF MOLDING BLOATED CELLULAR BLOCKS
Filed Aug. 2, 1929
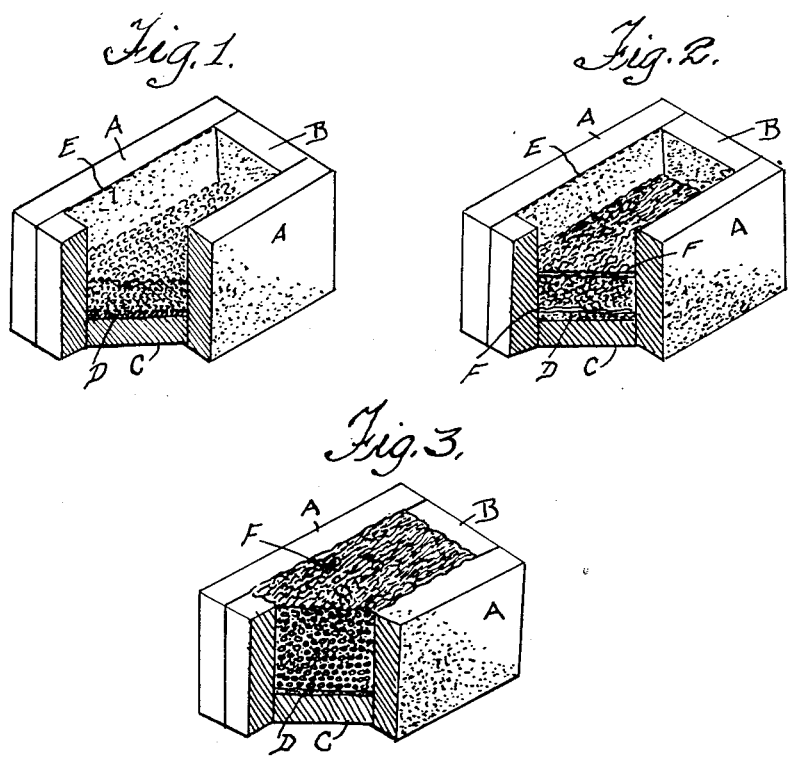
Inventor
Kemper Slidell.
By Samuel W. Banning
Atty.

Patented Jan. 12, 1932

1,840,609

UNITED STATES PATENT OFFICE

KEMPER SLIDELL, OF MADISON, ILLINOIS, ASSIGNOR, BY MESNE ASSIGNMENTS, TO AMERICAN FACE BRICK RESEARCH CORPORATION, A CORPORATION OF ILLINOIS

METHOD OF MOLDING BLOATED CELLULAR BLOCKS

Application filed August 2, 1929. Serial No. 382,859.

This invention relates to a method of molding bloated cellular blocks intended for building purposes, and preferably formed of clay, shale, or other argillaceous or earthy materials adapted, when heated under proper conditions, to swell or bloat by the evolution of gases entrapped within the material of the mass, so that the resulting product will be in the form of a block of vitreous material interspersed with cells presenting the physical condition of baked bread.

A block of this cellular material, formed according to the method of the present invention, will be enclosed or encased within a continuous skin or shell of fused material formed by the coalescence by fusion of the original granular particles, and within the shell or skin the vitreous cell walls will extend continuously, so that the block of material is interspersed with separated globular cells preferably of a diameter not to exceed one-eighth of an inch, but varying more or less in size due to inherent variations in the distribution of gas forming constituents and variations in the penetration of the heat and other factors involved in the process of producing the material.

However, a block formed in the manner to be presently described will be relatively homogeneous in structure, light in weight, impervious to the penetration of water, abundantly strong to resist compression, and otherwise well adapted to serve as a building block for exterior walls, or for other purposes. It is also a good insulator against thermal changes and sound.

A slab of the bloated material may be easily cut into blocks of smaller size, if desired, although the method of the present invention is directed primarily to the formation of blocks or units of the ultimate size and shape intended for use, which obviates the necessity for cutting through the continuous and impervious skin or sheath which surrounds the block, and on the upper surface presents a pebbled or roughened texture of attractive appearance and well adapted to exterior wall construction.

In practicing the method of the present invention, I make use of clay and shales, or other argillaceous material of the character ordinarily employed in the making of bricks, which material is first crushed or broken up into particles which will pass through a screen of approximately one-sixth inch mesh, so that the particles will vary in size from dust up to particles of the size stated. Almost any argillaceous material is suitable for making this product. The purer fire clays may be so difficult to fuse as to be impracticable for use, but most clays or shales will make this material. Carbon, sulphur and iron are constituents of clay that contribute to or are perhaps essential to the making of a clay capable of being bloated.

The ground material is placed in some type of agitating kiln where it is rapidly heated to a temperature of from 1500 to 1800° F., the object being to heat to the highest practicable temperature at which the granular condition of the material will be preserved without fusion. I have found a rotary type of kiln very suitable for this purpose, but I do not limit myself to the use of this type of kiln. The purpose of this heating is to dry and uniformly heat the material without fusing it. As the material nears the temperature above stated, it first begins to give off internally created gases, and then if continued above this temperature, becomes sticky. These gases have an affinity for oxygen, so that to lessen the giving off of these gases, I find it advantageous to heat the material in an atmosphere as nearly devoid of oxygen as possible.

After this preheating step, the material while still in the granular state is transferred to some type of kiln in which the material can be quiescently heated to a higher temperature. The temperature is for most material run up to 2000° F. or 2300° F., which constitutes the bloating stage of the present process.

The material during the bloating stage is deposited in a mold which is preferably formed of carborundum, as this material stands up well under the high temperature required, and has added merits of being a good conductor of heat and of not contracting about the molded material when being cooled. Fire clay is not a good material for molds; it is a poor heat conductor and is so similar to the bloating clay as to produce chemical complications.

The carborundum molds are protected by a parting medium, usually loose sand in the bottom and graphite on the sides. The latter is made to adhere to the mold by being mixed with oil or an adhesive until the clay to be bloated is in place.

If desired, the entire operation, including preheating, bloating and annealing, can be performed within a mold of the character indicated, although for some purposes it is preferred to perform the preheating operation in an agitating kiln in the manner previously described, which is not practical in a mold, and the preheating under agitation has the advantage of driving off the more volatile gases, so that the material will bloat more uniformly than might be possible in cases where preheating as well as the bloating is performed within the mold.

Both methods of treatment are considered to be within the scope of the present invention, which is directed primarily to the performance of the bloating within the mold, since this is the operation which gives form and definition to the completed block. The use of the molds at this stage of the process, therefore, possesses special or peculiar advantages which do not attend the use of molds in the preheating and final cooling or annealing stages of the process.

The ultimate dimensions of the block as regards length and width will be accurately determined by the dimensions of the mold, but the depth of the block will depend upon the degree of bloating, and in practice it is customary to initially fill the mold with granular material to about half, or in some cases about a third, the depth of the mold, in preparation for a bloating operation, which will continue until the material substantially fills the mold to a level with the top of the mold, which is preferably open.

If the material contains the proper ingredients, and is ground to the required degree of fineness, and is preheated and bloated under properly regulated conditions, the bloating can be so regulated that in each instance the material will rise to substantially the top level of the mold, so that blocks of uniform thickness, as well as of uniform length and breadth, will be produced, and in such cases it will not be necessary to roll or otherwise level off the top surface. If, however, the surface is unduly irregular, it can be rolled or compressed while in the plastic state. However, for most purposes it is preferred to avoid contact with the upper surface in order that the desirable and attractive pebbled surface texture may be secured without disturbance, and as before stated this can be done if due care is exercised in the selection of the material and in the performance of the preheating and bloating operations.

The first action of the heat when the material is subjected to the bloating temperature is to fuse the surface particles so that they will form a vitrified sealing skin on all sides. This skin imprisons in the material a part of the air that is between the particles. As the heat penetrates beyond the skin it fuses or welds the particles together, expands the imprisoned air and liberates heat generated gases within the material. These gases are formed from the breaking down of sulphur, and other gas producing substances in the material. This expanded air and liberated gas forms bubbles or cells throughout the fused or vitrified mass, so that it has very much the structure of yeast leavened dough, the cell walls being vitrified material, and the identity of the original granules or particles having disappeared in the general liquefaction and bloating of the entire mass.

During the bloating stage, the material expands and puffs to from two to three times its original volume. I have found that material preheated to 1800° F. when placed in the bloating chamber, bloats to a suitable degree when heated from ten to fifteen minutes for each inch of original thickness, so that a two-inch bed of material will bloat to four inches in twenty to thirty minutes.

When cool, the material retains its cellular structure and becomes solid and somewhat brittle. If it is cooled rapidly, it shatters from the strains of contraction; therefore, I find that it is necessary to cool the material quite slowly to counteract this self-destructive tendency. It can be quickly cooled down to a cherry color without injury, but below this stage it must be cooled very slowly. I find that with the clays I have used, a four inch slab requires about three to six hours to reduce to a handling temperature.

If desired, the material can be cooled and annealed within the mold, although it is preferred in most cases to remove the bloated material from the mold as soon as it is cool enough to keep its form and anneal it out of the mold. This is highly advantageous in production work, as it permits of recharging the mold with preheated clay without any great change in the temperature of the mold, so that the life of the mold is increased and the work is speeded up by dividing the work and time of heating the material, and by retaining the heat of the mold acquired during the bloating operation.

To better illustrate the method of the present invention, I append drawings, wherein,—

Figure 1 is a perspective view of a mold showing the granular material spread over the floor of the mold before the bloating begins;

Fig. 2 is a similar view showing the initial formation of the skin or sheath; and Fig. 3 is a view showing the material completely bloated.

The mold as shown is of rectangular shape, with side walls A, end walls B, and a floor or base C. A layer of sand D is spread over the floor to prevent adherence of the material, and a coating E of graphite or the like is applied to the side walls.

The skin which initially forms over the surfaces is designated by F. At this stage, which is indicated in Fig. 2, the interior of the mass still continues to remain in the granular state. Fig. 3 shows the completely bloated block which has bloated sufficiently to lie substantially flush with the open top of the mold. In its completely bloated form, the upper exposed surface presents a pebbled appearance due to the fusing over of the top layer of granular particles, and since in most cases this pebbled surface will constitute the exposed surface in a wall or other structure, it is desirable to give it the desired color or texture.

In some cases, it may be desirable, in introducing a charge of granular material into the mold, to spread or sprinkle a surface layer of finer or more uniform particles or to employ a surface layer of material specially selected to give the desired coloration, or, if desired, special ingredients may be added to modify the color.

In most cases, it will be found desirable to perform the bloating operation in a neutral or reducing atmosphere, but in order to give the desired surface coloration to the completed block, it will usually be found preferable to admit an abundance of oxygen during the early stages of the annealing operation. Variations in color can be secured in one or more of the ways above indicated, or by other methods well understood in the brick making art.

By forming the blocks and molds in the manner described, the sides and bottom of the block will be substantially plane and of truly rectangular or other predetermined configuration, so that the blocks will fit regularly and evenly into a wall with the smoother surfaces in abutting relation to one another.

The outer or pebbled surface will be of rougher texture, and ordinarily this will constitute the exposed surface, so that a truly smooth or planate formation is not required or desirable.

Although the sides and base of the block are relatively smooth and plane, they nevertheless are of sufficiently rough texture to afford a highly desirable bonding surface, but if smoother surfaces or more exact dimensions are desired, these surfaces can be ground down to the desired degree.

If the block is cut to expose the cells, a pocketed surface will be presented which is highly desirable in construction work, since the pockets formed by cutting through the cells afford cup-like cavities for the retention of the cement or other bonding material employed.

I claim:

1. The method of forming cellular blocks which consists in first preheating granular particles of earthy material to a point below fusion, next in heating a layer of said material within a mold to a temperature sufficient to cause fusion and bloating of the material occasioned by the liberation of gases, and the formation of cells within the interior of the mass, and next in slowly cooling and annealing the blocks so formed.

2. The method of forming cellular blocks which consists in first breaking up argillaceous material into granular particles, second in preheating said particles under agitation, third in charging a mold with a layer of said preheated particles, and in subjecting the mass of material within the mold to a temperature adequate to first cause a searing over of the surfaces by fusion of the surface particles and in thereafter causing bloating of the mass and the formation of a cellular block by the liberation of gases within the mass of material, and in finally slowly cooling the block of material to anneal the same.

3. The method of forming cellular blocks which consists in first breaking up argillaceous material into granular particles, second in preheating said particles under agitation, third in charging a mold with a layer of said preheated particles, and in subjecting the mass of material within the mold to a temperature adequate to first cause a searing over of the surfaces by fusion of the surface particles and in thereafter causing bloating of the mass and the formation of a cellular block by the liberation of gases within the mass of material, and in finally removing the block of material from the mold and slowly cooling the same after removal to anneal the same.

4. The method of forming cellular blocks which consists in introducing earthy material while in a granular condition into a mold, and heating the same while in the mold by the application of external heat to a temperature adequate to produce bloating and the production of a cellular structure by the liberation of gases from within the mass of material, and regulating the heating so that the final shape of the block is determined by the mold.

5. The method of forming cellular blocks which consists in introducing earthy material while in a granular condition into a mold, and heating the same while in the mold by the application of external heat to a temperature adequate to produce bloating and the production of a cellular structure by the liberation of gases from within the mass of material, and regulating the heating so that the material in its bloated condition does not extend beyond the top level of the mold.

6. The method of forming cellular blocks which consists in first preheating granular particles of earthy material to a point below fusion, next in filling a layer of said preheated granular particles into a mold to a depth materially less than the depth of the mold, next in heating said layer within the mold by the application of external heat within an enclosed heat zone to a temperature sufficient to cause fusion and the bloating of the material occasioned by the liberation of the gases and the formation of cells within the interior of the mass, the configuration of the mass while undergoing bloating being restricted by the confines of the mold.

7. The method of forming cellular blocks which consists in filling a layer of particles of earthy material in granular form into a mold to a depth materially less than the depth of the mold, next in heating said layer within the mold by the application of external heat within an enclosed heat zone to a temperature sufficient to cause fusion and the bloating of the material occasioned by the liberation of gases and the formation of cells within the interior of the mass, the configuration of the mass while undergoing bloating being restricted by the confines of the mold.

In witness that I claim the foregoing I have hereunto subscribed my name this 23rd day of July, 1929.

KEMPER SLIDELL.